Jan. 7, 1958 A. P. MILLER 2,818,855
SURGICAL DEVICE
Filed Feb. 11, 1954

INVENTOR.
ANTHONY P. MILLER
BY
ATTORNEYS

United States Patent Office 2,818,855
Patented Jan. 7, 1958

2,818,855

SURGICAL DEVICE

Anthony P. Miller, Atlantic City, N. J.

Application February 11, 1954, Serial No. 409,579

6 Claims. (Cl. 128—79)

This invention relates to a surgical device and, more specifically, to a device for use in maintaining an erection of the male regenerative organ.

The primary object of the invention is to provide a device which is easily applied to the penis to insure throughout the performance of intercourse constant pressure on the dorsal vein through which blood leaves the penis regardless of any increase or decrease in size of the organ without giving rise to any restriction of the urethra.

It is a further object of the invention to provide an apparatus which is relatively unnoticeable and which is comfortable to both the male and the female.

It is a further object of the invention to provide a device which is easily applied and removed from the penis and which includes provision for adjustment of the pressure applied by the device upon the penis.

Figure 1:
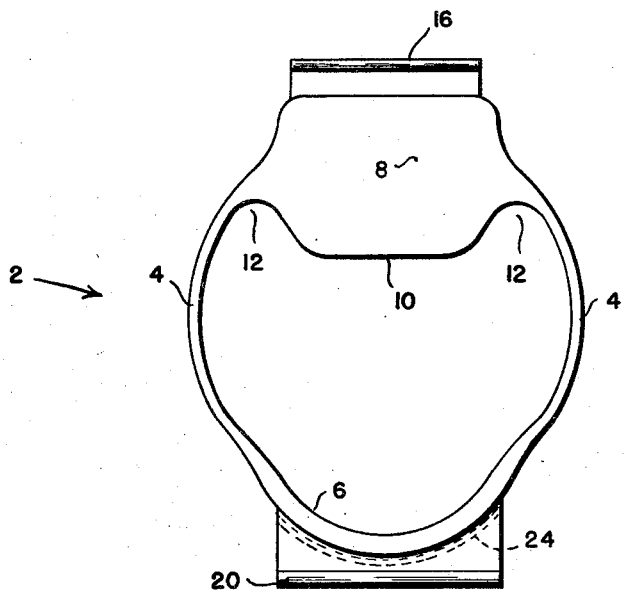
Figure 3:
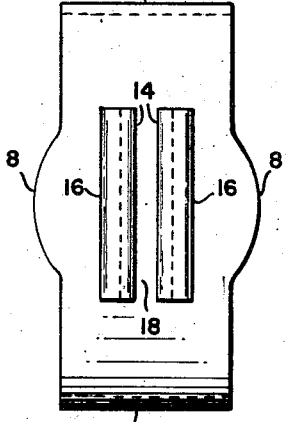
Figure 2:
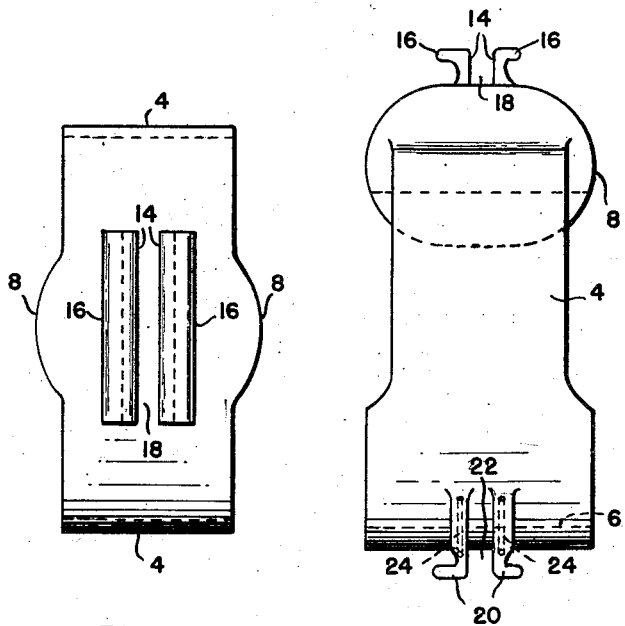

These and other objects of the invention will become apparent from the accompanying description when read in conjunction with the accompanying drawings, in which:

Figure 1 is a front elevation of the device;
Figure 2 is a side elevation of the device; and
Figure 3 is a top view of the device.

The device, which is indicated generally at 2 in Figure 1, is in the form of an endless elastic member which is adapted to encircle the penis. The member is preferably made of a flesh colored rubber in order to provide a relatively unnoticeable device which is soft, sanitary and comfortable to both the male and the female.

The device includes side portions 4, which are formed of relatively thin elastic material, and a bottom portion 6 which is formed to be of greater thickness and stiffness than the side portions 4. The upper portion of the device is of greatly increased section as indicated at 8 and includes an inwardly extending projection 10 preferably formed of a relatively firm or hard rubber. The elastic side portions 4 are joined to the upper portion 8 on either side of the projection 10 and form in conjunction therewith recesses 12.

Extending outwardly from the upper portion of the device is a pair of transversely or generally circumferentially extending members 14. Each of the members 14 is provided with a flange at its outermost edge and the two members 14 are spaced so as to provide a generally circumferential slot 18 therebetween. A pair of members 20 are affixed to the lower outer surface of the device and provide between them a circumferentially extending slot 22. A stiffening member 24 is molded into each of the members 20 at the base thereof. The stiffening members may be formed, for example, of metal, a suitable plastic material or hard rubber and provide with the members 20 additional stiffening for the lower portion 6 of the endless elastic member. It will be evident that a stiffening member could equally well be moulded into the lower portion 6 of the endless member.

The formation of the device as described provides, when the device is applied at the base of the penis, local pressure upon the dorsal vein in the penis as a result of the engagement of the projection 10 therewith to restrict the flow of blood outwardly from the penis through the dorsal vein. The spacing between the projection 10 and the elastic side member 4 insures the absence of any pressure on the arteries. Thus, there is complete freedom for the flow of blood into the penis. The lower portion of the device as indicated generally at 6, which is preferably formed of greater thickness than the side portions 4 thereof, is, as previously noted, reinforced by the outwardly extending members 20. This structure serves to apply a uniformly distributed pressure over the ventral portion of the penis and thus restriction of the urethra is avoided.

Further utility lies in the relatively stiff lower portion of the device in that it serves to prevent any rotation of the device while in use and thus assures that the projection 10 remains in proper position immediately above the dorsal vein regardless of changes in size of the organ.

The projecting members 14 and 20 provided at the top and bottom of the device are provided with outwardly extending flanges to facilitate the gripping of the members by the thumb and forefinger of the user and thus the device may be easily applied and removed.

Further utility lies in these projecting members in that the grooves 18 and 22 between the members form circumferentially extending slots adapted to receive elastic bands which may be positioned around the device to increase the pressure thereof upon the penis.

It will be evident that the device provides a simple and sanitary means which is extremely practical and effective physiologically and highly satisfactory psychologically for accomplishing the objects of the invention as enumerated herein. It will be evident that modifications may be made to the embodiment of the invention as disclosed herein without departing from the scope of the invention as set forth in the following claims.

What is claimed is:

1. A surgical device comprising an endless elastic member adapted to encircle the penis, the uppermost portion of the inner surface of the device being formed with an inwardly extending projection to provide local pressure upon the dorsal vein to restrict the flow of blood outwardly from the penis, and the device being formed with a reinforced portion extending over only the lower portion thereof to apply uniformly distributed pressure to the ventral portion of the penis so as not to close off the urethra.

2. A surgical device comprising an endless flesh colored rubber member adapted to encircle the penis, the uppermost portion of the inner surface of the device being formed with an inwardly extending projection to provide local pressure upon the dorsal vein to restrict the flow of blood outwardly from the penis, and the device being formed with a reinforced portion extending over only the lower portion thereof to apply uniformly distributed pressure to the ventral portion of the penis so as not to close off the urethra.

3. A surgical device comprising an endless elastic member adapted to encircle the penis, the uppermost portion of the inner surface of the device being formed with an inwardly extending firm projection to provide local pressure upon the dorsal vein to restrict the flow of blood outwardly from the penis, the side portions of the device being elastic, and the lower portion of the device being relatively stiff in comparison with the side portions and formed to apply uniformly distributed pressure to the ventral portion of the penis so as not to close off the urethra.

4. A surgical device comprising an endless elastic member adapted to encircle the penis, the uppermost portion of the inner surface of the device being formed with an inwardly extending projection to provide local pressure upon the dorsal vein to restrict the flow of blood outwardly from the penis, and the device being formed with a reinforced portion extending over only the lower portion thereof to apply uniformly distributed pressure to the ventral portion of the penis so as not to close off the urethra, the device also including at the upper and lower outer surfaces thereof outwardly projecting members adapted to be gripped by a user of the device to facilitate application and removal of the device.

5. A surgical device comprising an endless elastic member adapted to encircle the penis, the uppermost portion of the inner surface of the device being formed with an inwardly extending projection to provide local pressure upon the dorsal vein to restrict the flow of blood outwardly from the penis, and the device being formed with a reinforced portion extending over the lower portion thereof to apply uniformly distributed pressure to the ventral portion of the penis so as not to close off the urethra, the device also including at the upper and lower outer surfaces thereof pairs of outwardly projecting circumferentially extending members providing slots for receiving endless elastic members positioned circumferentially around the device to increase the pressure thereof upon the penis.

6. A surgical device comprising an endless elastic member adapted to encircle the penis, the uppermost portion of the inner surface of the device being formed with an inwardly extending firm projection to provide local pressure upon the dorsal vein to restrict the flow of blood outwardly from the penis, the side portions of the device being elastic, and the device including stiffening means extending over only the lower portion thereof and being formed to apply uniformly distributed pressure to the ventral portion of the penis so as not to close off the urethra.

References Cited in the file of this patent

UNITED STATES PATENTS

| | | |
|---|---|---|
| 2,226,409 | Patterson et al. | Dec. 24, 1940 |
| 2,646,795 | Scholl | July 28, 1953 |
| 2,649,086 | Sluijter | Aug. 18, 1953 |

FOREIGN PATENTS

| | | |
|---|---|---|
| 36,015 | Austria | Jan. 25, 1909 |